June 27, 1967 W. O. HENSCHKE 3,327,826
BRAKED LINEAR ACTUATOR OPERATED BY ROTATIONAL MOVEMENT
Filed Aug. 3, 1965 2 Sheets-Sheet 1

INVENTOR.
William O. Henschke
BY
Johnson and Kline
ATTORNEYS

June 27, 1967     W. O. HENSCHKE     3,327,826
BRAKED LINEAR ACTUATOR OPERATED BY ROTATIONAL MOVEMENT
Filed Aug. 3, 1965     2 Sheets-Sheet 2

INVENTOR.
William O. Henschke
BY
Johnson and Kline
ATTORNEYS

United States Patent Office 3,327,826
Patented June 27, 1967

3,327,826
BRAKED LINEAR ACTUATOR OPERATED BY ROTATIONAL MOVEMENT
William O. Henschke, Avon, Conn., assignor to The Superior Electric Company, Bristol, Conn., a corporation of Connecticut
Filed Aug. 3, 1965, Ser. No. 476,795
9 Claims. (Cl. 192—141)

The present invention relates to an actuator that provides linear movement from rotary motion and more particularly to such an actuator that is braked against reverse movement when encountering a resistance to linear movement of a predetermined quantity.

In my copending application Serial No. 426,635 there is disclosed a rotary motor of the type disclosed in U.S. Patent No. Re. 25,445 which through a ball nut and threaded shaft or screw serves to translate the rotary motion of the motor into a linear movement of the screw. While such a construction is generally satisfactory, it has been found that when the screw is employed to operate a device which exerts an axial thrust force or load on the screw opposing its movement, that such a force tends to cause opposite displacement or movement of the screw from its desired position when the motor stalls or becomes deenergized.

Though a self-locking nut and screw may be employed which prevents the thrust load from displacing the screw, such is not satisfactory as it requires a very low efficient nut and screw arrangement which would be subject to extreme wear and hence not be durable. A nut and screw having a low efficiency moreover is apt to be susceptible to vibration and to chattering plus of course a lack of accuracy which respect to the displacement of the actuator which respect to a rotational displacement of the motor. In addition, at least with the specific type of reversible motor employed, it is desirable to provide a relatively highly efficient unit which enables most of the torque of the motor to be changed into a linear forcing of the actuator.

It is accordingly an object of the present invention to provide a linear actuator operated by a rotational movement which, though relatively highly efficient and extremely durable, also prevents reverse movement of the actuator upon a stoppage of the rotary motion even with an axial thrust maintained on the actuator.

Another object of the present invention is to provide in a linear actuator for a brake to prevent reverse movement of the actuator with the brake becoming effective whenever the axial thrust loading on the actuator increases beyond a predetermined level.

A further object of the present invention is to provide for a linear actuator operated by a rotary motor which achieves the above object but yet in which when the actuator is operated in a reverse direction from its braked condition, the torque required by the motor to overcome the braked condition is minimized.

Still another object of the present invention is to provide a linear actuator which is relatively economical to manufacture and which is highly efficient in translating the torque of a reversible electric motor into a linear force.

In carrying out the present invention there is provided a rotary motor of the stepping and reversible type, a threaded shaft or screw and a ball nut. In one embodiment herein disclosed, the screw is rotated and the nut is moved only linearly while in a second embodiment the shaft moves only linearly and the nut is rotated. In both embodiments of the invention, when the linear moving member engages a thrust load or restraint to movement such as an abutment, its linear movement ceases when the restraint exceeds a predetermined level. However, the rotational movement of the motor continues and the additional rotational movement of the motor is employed to cause the rotational member to not only be rotated but also to be moved linearly in a direction opposite to the direction which the linear member had previously moved. The rotating member carries part of a friction brake and as it is linearly moved it causes its part of the brake to lock against a stationary part of the brake. The motor will continue to rotate the member until the brake parts are so frictionally united that further movement therebetween requires a force greater than the torque of the motor and thus the motor may stall.

Upon the motor stalling or otherwise becoming deenergized, the friction brake maintains the rotational member against movement and hence locks the linear member against reverse linear movement. When the brake is effective it is capable of preventing movement of the linear moving member with or without an axial thrust load thereon.

The linear movement of the rotating member to achieve braking is against the action of spring means and thus the characteristics of the spring means determine the value of the thrust load which causes braking to occur. Additionally, when the motor is energized in the reverse direction to move the linearly moving member in the reverse direction, the spring overcomes a portion of the static friction between the brake parts thereby decreasing the motor torque required to release the brake to a value less than if the spring was not aiding the motor.

Other features and advantages will hereinafter appear.

Figure 1:
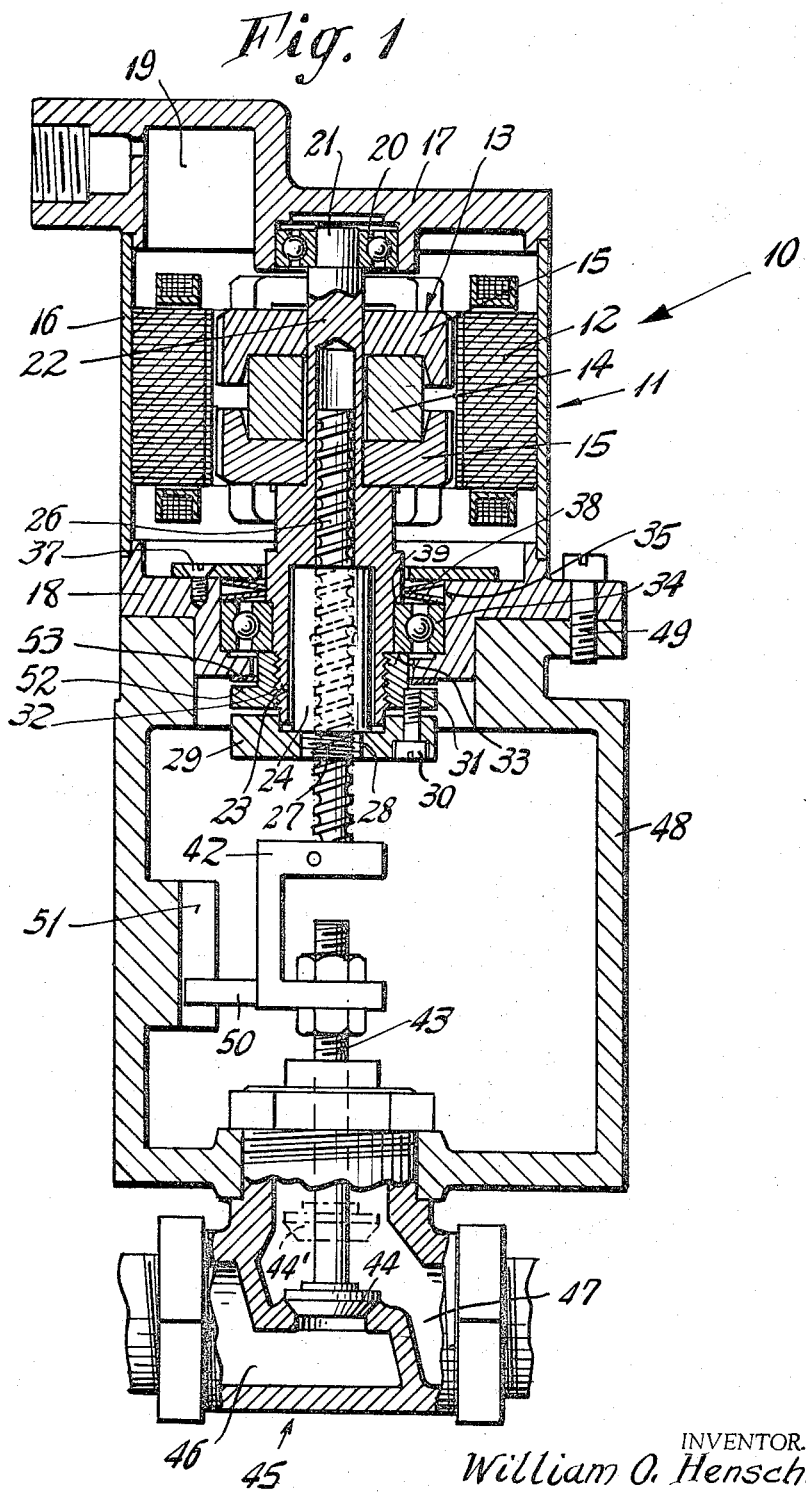
FIGURE 1 is an elevation, in section, of one embodiment of the linear actuator of the present invention in which the ball nut rotates and the screw moves linearly.

Referring to the drawing, the embodiment of the invention shown in FIG. 1 is generally indicated by the reference numeral 10 and includes an electric motor 11. The motor is of the reversible, stepping type, such as disclosed in the above-noted reissue patent, and includes a stator 12 and a rotor 13 with the rotor having a permanent magnet 14 and a pair of end caps 15. The adjacent peripheries of the end caps 15 and the stator 12 are toothed to provide the desired operational characteristics of the motor. The stator 12 is supported on the interior of a cylindrical member 16 which maintains in spaced relation a pair of end bells 17 and 18.

The end bell 17 is formed to provide a passage 19 for electric connections to the coils of the stator 12 and in addition supports a ball bearing 20 whose inner race engages an end 21 of a shaft 22. The other end of the shaft 22 is formed with a cylindrical cavity 23 in which is mounted a ball nut 24. An axial bore 25 is formed in the shaft and in which a threaded rod or screw 26 is linearly relatively movable.

A threaded end 27 of the ball nut 24 mates with a threaded aperture 28 formed in a collar 29 to enable the ball nut to be clamped between the end of the cylindrical cavity 23 and the collar 29 and thus prevent relative rotation between it and the shaft 22. At least one screw 30 extends between the collar 29 and a flanged member 31 with the latter being threaded on a threaded exterior portion 32 of the shaft.

An end 33 of the flanged member 31 abuts the inner race of a ball bearing 34 that sits within a cylindrical opening 35 formed in the end bell 18. An annular disk 36 is secured as by screws 37 to the interior of the end bell 18 and serves as a pressure plate for a spring means 38. The spring means 38 is preferably, as shown, a pair of dished washers though if desired a helical spring may be employed and the spring means as more fully hereinafter set forth is under compression between the disk 36 and the outer race of the ball bearing 34. The inner race of the ball bearing 34 is clamped between a flange 39 formed in the shaft 22 and the end of the flanged member 31 while its outer race is axially movable in the cylindrical opening 25. Normally the spring means 38 causes the outer race to assume the position shown wherein the outer race engages the bottom 40 of the opening 35.

The outer end 41 of the screw 26 is secured by a coupling 42 to a threaded rod 43 that linearly actuates a movable valve member 44 of a valve 45 having an inlet 46 and an outlet 47. It will be appreciated that as the member 44 is moved between its dotted line position 44' and its closed, solid line position that the valve is respectively opened and closed. Moreover, it will be appreciated that in its closed position the rod 43 exerts an axial force on the member 44 to maintain it seated against the pressure of the fluid in the inlet 46 that is exerted against the member 44. Thus there is an axial thrust load on the rod 43, coupling 42, screw 26 and thence through the ball nut to the shaft 22.

The valve preferably includes a cylindrical part 48 which is secured as by screws 49 to the end bell 18.

In the operation of the linear actuator of the present invention, the motor 11 is energized when it is desired to move the valve member 44 from its opened position 44' to its closed position. The motor rotates the shaft 22 and the ball nut 24 in a counterclockwise direction to cause the screw 26 to be linearly moved downwardly. The screw 26 is held against rotation in any desired manner as by a pin 50 riding in a slot 51 formed in the part 48. Upon the member 44 seating itself to close the valve 45, the screw 26 is prevented from further linear movement. However, the ball nut is continued to be rotated by the motor 11 and the rotation of the ball nut is transferred into linear movement of the nut upwardly on the screw 26. The upward movement is resisted by the spring means 38 but continues until a flat annular portion 52 constituting one part of a brake engages a brake lining 53 secured on the end bell 18 and constituting the other part of the brake. Thus the ball nut 24, collar 29 and flange member 31 are rotationally and axially moved until the surfaces 52 and 53 become engaged with sufficient friction to cause the motor 11 to stall. However, the screw 26 even though capable of normally being reversely moved by the axial force exerted against the member 44 fails to reversibly rotate the ball nut by reason of it being locked by the brake parts 52 and 53 against movement.

It will be appreciated that the compressibility of the spring means 38 in resisting upward movement of the ball bearing 34 is selected to be greater than the force required to seat the member 44 and maintain it so seated. Thus the spring means will not become compressed and enable the brake to function until the screw is opposed by an axial force greater than the compressibility of the spring means 38. The force exerted and maintained by the linear actuation is thus set, within the capabilities of the motor by the characteristics of the spring.

Upon it becoming desirous to move the member 44 from its closed position to its open position, the motor 11 is energized to rotate the shaft 22 and ball nut 24 in a clockwise direction. The friction between the brake parts 52 and 53 is sufficient to stall the motor 11 and hence would thus require a force greater than the stalling torque of the motor to cause them to become separated. However, in the present invention the spring means 38 adds its compressed energy to the rotational torque of the motor and thus the combination of the two has been found sufficient to separate the members 52 and 53 even though such a force is larger than the motor itself is capable of generating.

It will further be appreciated that if the spring means 38 has a greater resistance to compression than the axial thrust load produced by the member 44 that the ball nut will initially rotate and be forced by the spring means 38 downwardly to separate the two brake parts 52 and 53 before the member 44 begins its initial upward movement.

The ball bearings 20 and 34 are disposed in their end bells in a manner which enables axial linear movement thereof with said movement slight and approximating the linear distance that the two brake parts move with respect to each other. The shaft 22 together with the components carried thereto also linearly move with the ball bearings but such movement has been found to be so slight as to not interfere with the normal interaction between the stator and rotor.

Figure 2:
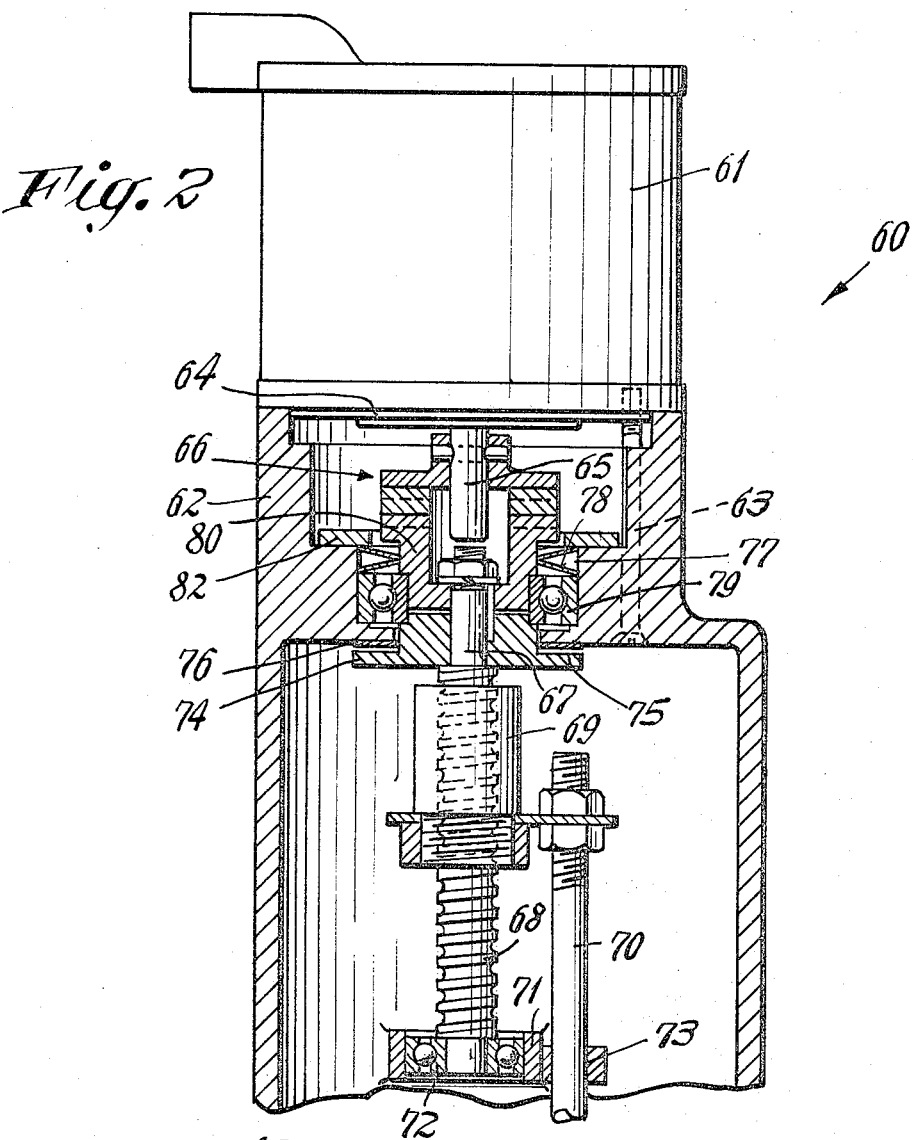
FIG. 2 is a view of another embodiment, similar to FIG. 1, in which the screw is rotated and the ball nut moves linearly.

In FIG. 2 there is shown another embodiment of a linear actuator of the present invention in which the motor rotates the screw and the nut is restrained against movement and moves only linearly. In this embodiment, generally indicated by the reference numeral 60, there is provided a motor 61 of the same type as used in the previous embodiment and it is secured to a valve casing 62 as by screws 63 being threaded into an end face 64 of the motor 61. The motor shaft 65 is secured as by an Oldham coupling 66 to an end 67 of a screw 68. Cooperating with the screw 68 is a ball nut 69 which is connected to linearly actuate a rod 70 that may operate a valve member in the same manner that the rod 43 operates the valve 45. A support 71 in the valve casing holds a ball bearing 72 which supports the other end of the screw 68. The support 71 is also formed with a guideway 73 through which the rod 70 extends and which prevents rotation of the rod 70 and ball nut 69.

The end 67 of the screw 68 has secured thereon a brake disk 74 having a brake surface 75 while another brake part consisting of a lining 76 is fastened oppositely thereto on the valve casing 62. The valve casing is formed with a cylindrical cutout 77 in which spring means 78 similar to the spring means 38 is positioned and in which a ball bearing 79 is also contained. The inner race of the ball bearing 79 is clamped by the brake disk 74 and the adjacent end 80 of the Oldham coupling while the outer race thereof engages the spring means 78 and the bottom 81 of the cutout 77. The bearing 79 is capable of axially moving in the cutout 77 against the urgings of the spring means 78. The cutout 77 is partially closed by an annular disk 82 and against which the spring means 78 bears.

It will be appreciated that with this construction, as the screw 68 is rotated in a clockwise direction by the motor 61, the rod 70 is forced downwardly until it engages an axial force that is greater than the expansible urgings of the spring means 78 as for example as when a valve member seats. Subsequent clockwise rotation of the motor 61 is transfered into a rotational and linear movement of the screw 68 by reason of the ball nut being stationary to cause the brake surface 75 and lining 76 to become frictionally engaged and stall the motor. Even in the stalled condition of the motor or if desired, after it has been de-energized, there is still exerted on the rod 70 an axial thrust but it is insufficient to cause rotation of the screw 68 as the brake prevents rotation of the screw. However, upon counterclockwise rotation of the motor 61, the spring means 78 aids the motor torque to initially linearly and rotatably move the screw 68 downwardly to release the brake prior to moving the rod 70 upwardly to open the valve.

While the specific embodiment shown herein discloses an Oldham coupling it will be appreciated that such is employed in order to compensate if necessary for axial alignment between the shaft 65 and screw 68 and if desired could be eliminated but however a member similar to the member 80 must be provided to retain the ball bearing 79. Also, the Oldham coupling permits some relative axial movement between its parts, which is sufficient to absorb the linear movement of the screw 68 without causing linear movement of the shaft of the motor.

Figure 3:
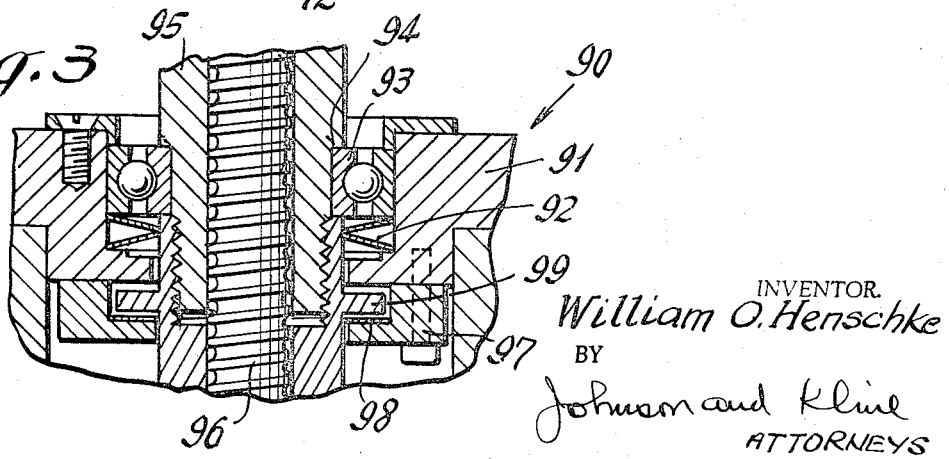
FIG. 3 is a sectional detail of a further embodiment of the present invention in which the braking action occurs between a rotating ball nut and a linearly moving screw when the screw moves in the direction opposite to that shown in FIGS. 1 and 2.

Shown in FIG. 3 is still another embodiment of the present invention which is substantially similar to the embodiment shown in FIG. 1 and is generally indicated by the reference numeral 90. In this embodiment, the screw moves only axially as the nut rotates. However, rather than having the braking occur when moving downwardly to engage a restraint, the braking occurs when the screw is traveling upwardly and engages a restraint. Thus there is provided an end bell 91 which supports spring means 92 and a ball bearing 93 with the inner race of the ball nut abutting a flange 94 formed in a ball nut 95. A screw 96 cooperates with the ball nut and is driven by a motor such as the motor 11. Secured to the end bell is an inwardly flanged member 97 carrying a brake lining 98 while an outwardly extending flange 99 is carried by the ball nut. Thus as the ball nut 95 is rotated clockwise to move the screw 96 upwardly the screw moves until it encounters a restraint greater than the expansive urgings of the spring means 92. Continued rotation of the motor will maintain an axial thrust on the screw but will be translated into rotational and linear movement of the ball nut against the spring means 92. Flange 99 then engages the brake lining 98 and the brake becomes effective. As in the other embodiments when the ball nut is rotated to move the screw downwardly, the spring means 92 aids the motor torque in releasing the brake.

It will accordingly be appreciated that there has been disclosed a linear actuator which is operated by a rotational movement. The actuator consists of a screw and ball nut that have a relatively high efficiency and thus unless restrained could enable an axial linear thrust on the actuator to cause a reverse linear movement by the rotating member being reversely rotated. The present invention prevents unwanted movement that could be caused by an axial thrust while at all times when desired maintaining the thrust without even any slight reverse movement by having the rotating member continue to rotate after the linear actuator has been restrained from movement. The additional rotation of the rotating member also moves the member linearly and causes the brake parts to become engaged and stop further movement. The linear motion of the rotating member is against the urgings of a spring means and thus the thrust required to effect braking is determined by the characteristics of the spring means. When desired to move the linear actuator in a reverse condition, the compressed spring means adds its energy to that of the rotational movement producing motor thereby assuring that the brake will be rendered ineffective even though the force required to release the brake may be greater than the torque of the motor.

Variations and modifications may be made within the scope of the claims and portions of the improvements may be used without others.

I claim:

1. A linear actuator operated by a rotational movement comprising a support, a screw member and a ball nut member, said members being relatively efficient and capable of translating axial thrust on one member into rotative movement of the other member, rotational motor means connected to one of said members for rotating same, means interconnecting said one member to the other member for translating the rotational movement of the one member into linear movement of the other member, means mounting said one member for axial movement between a first and a second position, spring means for urging the one member to the first position and brake means including one element carried by the member and another element carried by the support, said elements being spaced at the first position of said one member and being engaged at the second position of said one member, whereby said one member is axially moved from its first position to its second position upon the other member being restrained by a thrust greater than the urgings of the spring means.

2. A linear actuator operated by a rotational movement comprising a support, a screw member and a ball nut member, said members being relatively efficient and capable of translating axial thrust on one member into rotative movement of the other member, rotational motor means connected to one of said members for rotating same, means interconnecting said one member to the other member for translating the rotational movement of the one member into linear movement of the other member, means mounting said one member for axial movement between a first and a second position, spring means for urging the one member to the first position and brake means including one element carried by the member and another element carried by the support, said elements being spaced at the first position of said one member and being engaged at the second position of said one member, the engagement between said elements at the second position producing loading on said motor greater than the torque of said motor, whereby said one member is axially moved from its first position to its second position upon the other member being restrained by a thrust greater than the urgings of the spring means.

3. A linear actuator operated by a rotational movement comprising a support, a screw member and a ball nut member, said members being relatively efficient and capable of translating axial thrust on one member into rotative movement of the other member, rotational motor means connected to one of said members for rotating same, means interconnecting said one member to the other member for translating the rotational movement of the one member into linear movement of the other member, means mounting said one member for axial movement between a first and a second position, said axial movement occurring by the one member rotating without axial movement of the other member, spring means for urging the one member to the first position and brake means including one element carried by the member and another element carried by the support, said elements being spaced at the first position of said one member and being engaged at the second position of said one member, whereby said one member is axially moved from its first position to its second position upon the other member being restrained from movement by a thrust greater than the urgings of the spring means.

4. A linear actuator operated by a rotational movement comprising a support, a screw member and a ball nut member, said members being relatively efficient and capable of translating axial thrust on one member into rotative movement of the other member, rotational motor means connected to one of said members for rotating same, means interconnecting said one member to the other member for translating the rotational movement of the one member into linear movement of the other member, means mounting said one member for axial movement between a first and a second position, spring means for urging the one member to the first position and brake means including one element carried by the member and another element carried by the support, said elements being spaced at the first position of said one member and being engaged at the second position of said one member, the engagement between said elements at the second position producing loading on said motor that is greater than the torque of said motor, whereby said one member is axially moved from its first position to its second position upon the other member being restrained by a thrust greater than the urgings of the spring means, said spring means urging said one member between its first and second positions with a force that is less than the torque of said motor.

5. A linear actuator operated by a rotational movement comprising a support, a screw member and a ball nut member, said members being relatively efficient and capable of translating axial thrust on one member into rotative movement of the other member, reversible rotational motor means connected to one of said members for rotating same in one direction or the other, means interconnecting said one member to the other member for translating the rotational movement of the one member into linear movement of the other member in one direction or the other, means mounting said one member for axial movement between a first and a second position, spring means for urging the one member to the first position and brake means including one element carried by the member and another element carried by the support, said elements being spaced at the first position of said one member and being engaged at the second position of said one member whereby said one member is axially moved from its first position to its second position upon the other member being restrained by a thrust greater than the urgings of the spring means when it is moved in the one direction and in which said spring means at said second position exerts an axial thrust on said one member which is translatable into a rotational movement of said other member, said rotational movement being in the same direction which the motor moves the one member in the other direction, whereby said spring means aids the motor in moving the one member from its second position to its first position to thereby cause the elements to become disengaged.

6. The invention as defined in claim 5 in which the said one member is the ball nut and in which the other member is the screw.

7. The invention as defined in claim 6 in which the motor means includes a motor having a stator and a rotor, means mounting the ball nut on the rotor for movement therewith and means for mounting the rotor for axial movement with respect to the stator.

8. The invention as defined in claim 5 in which the said one member is the screw and the other member is the ball nut.

9. The invention as defined in claim 8 in which the motor means includes an electric motor having a shaft and coupling means interconnecting the shaft to the screw to enable relative axial movement between the shaft and the screw.

References Cited
UNITED STATES PATENTS 2,660,281 11/1953 Ochtman _____ 192—141
3,161,074 12/1964 Korthaus et al. _____ 192—2

BENJAMIN W. WYCHE, III, *Primary Examiner.*